United States Patent [19]

Hagen

[11] 4,212,445
[45] Jul. 15, 1980

[54] ADJUSTABLE MOUNTING, AND SECURING AND FASTENING ASSEMBLY WITH CHANNEL BAR

[76] Inventor: Magnus F. Hagen, 434 Panorama Dr., Laguna Beach, Calif. 92651

[21] Appl. No.: 915,818

[22] Filed: Jun. 15, 1978

Related U.S. Application Data

[63] Continuation-in-part of Ser. No. 808,999, Jun. 22, 1977.

[51] Int. Cl.² ................................................ F16M 13/00
[52] U.S. Cl. ............................. 248/245; 248/222.1; 248/295 B
[58] Field of Search ............. 248/222.1, 245, 295 A, 248/295 B, 295 R; 24/221 L, 221 RC; 85/5 P; 403/387, 406

[56] References Cited

U.S. PATENT DOCUMENTS

| | | | |
|---|---|---|---|
| 593,601 | 11/1897 | Neely | 248/245 X |
| 799,092 | 9/1905 | Rosenfeld | 248/DIG. 9 |
| 1,264,837 | 4/1918 | Moen | 248/295 A |
| 1,632,036 | 6/1927 | Mullen | 248/295 A X |
| 2,002,339 | 5/1935 | Copeman | 248/245 X |
| 2,517,308 | 8/1950 | Harrs | 248/387 |
| 2,744,714 | 5/1956 | Parke | 248/245 |
| 3,123,389 | 3/1964 | Biesecker | 24/221 L |
| 3,250,584 | 5/1966 | Tassell | 248/245 X |
| 3,462,110 | 8/1969 | Cheslock | 248/245 X |
| 4,143,848 | 3/1979 | Slemmons | 248/489 |

FOREIGN PATENT DOCUMENTS

| | | | |
|---|---|---|---|
| 1429553 | 11/1968 | Fed. Rep. of Germany | 248/295 |
| 1560593 | 2/1969 | France | 248/245 |
| 1021879 | 3/1966 | United Kingdom | 248/245 |
| 1142142 | 2/1969 | United Kingdom | 85/5 P |

Primary Examiner—William H. Schultz
Attorney, Agent, or Firm—Francis X. LoJacono

[57] ABSTRACT

An adjustable mounting, and securing and fastening assembly comprising the combination of an elongated channel bar, generally positioned in a vertical arrangement and mounted to a substantially stationary member, such as a wall of a structure, the channel bar including a plurality of longitudinally aligned holes disposed in the main rear wall thereof, the front wall having an elongated slot defining oppositely arranged inwardly projecting flanges, whereby access to the holes is provided through the aligned slot; and a fastener member is formed to be removably received in the channel bar wherein a stud member of the fastener is inserted into one of the channel holes. The fastener member includes a locking bar, a main support body and a front mounting bar, the locking bar being arranged to be mounted within the channel bar and rotatably locked therein, wherein a member to be mounted is positioned over the front mounting bar, and held in place between the front wall of the channel member and the front mounting bar when the fastener member is rotated 90°; and wherein the space between the locking bar and mounting bar is equal to the combined thickness of the front wall flanges and the member to be mounted thereon.

11 Claims, 16 Drawing Figures

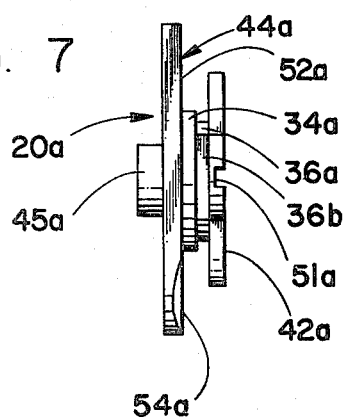
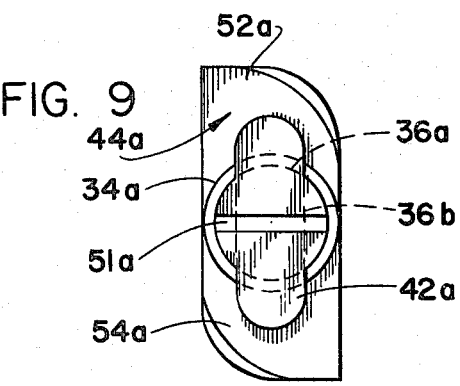
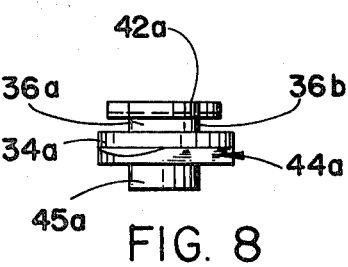
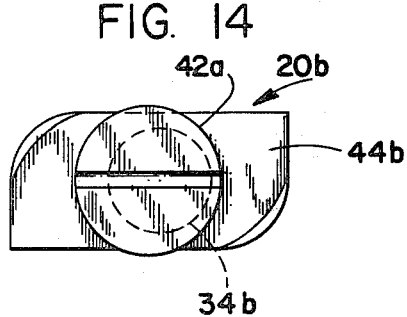
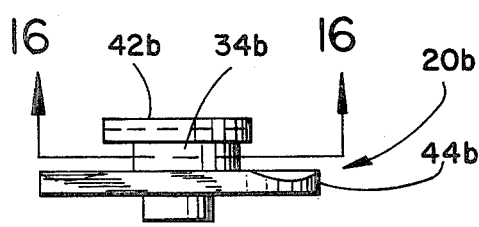
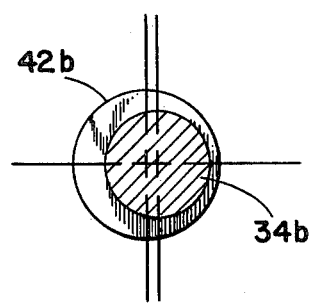

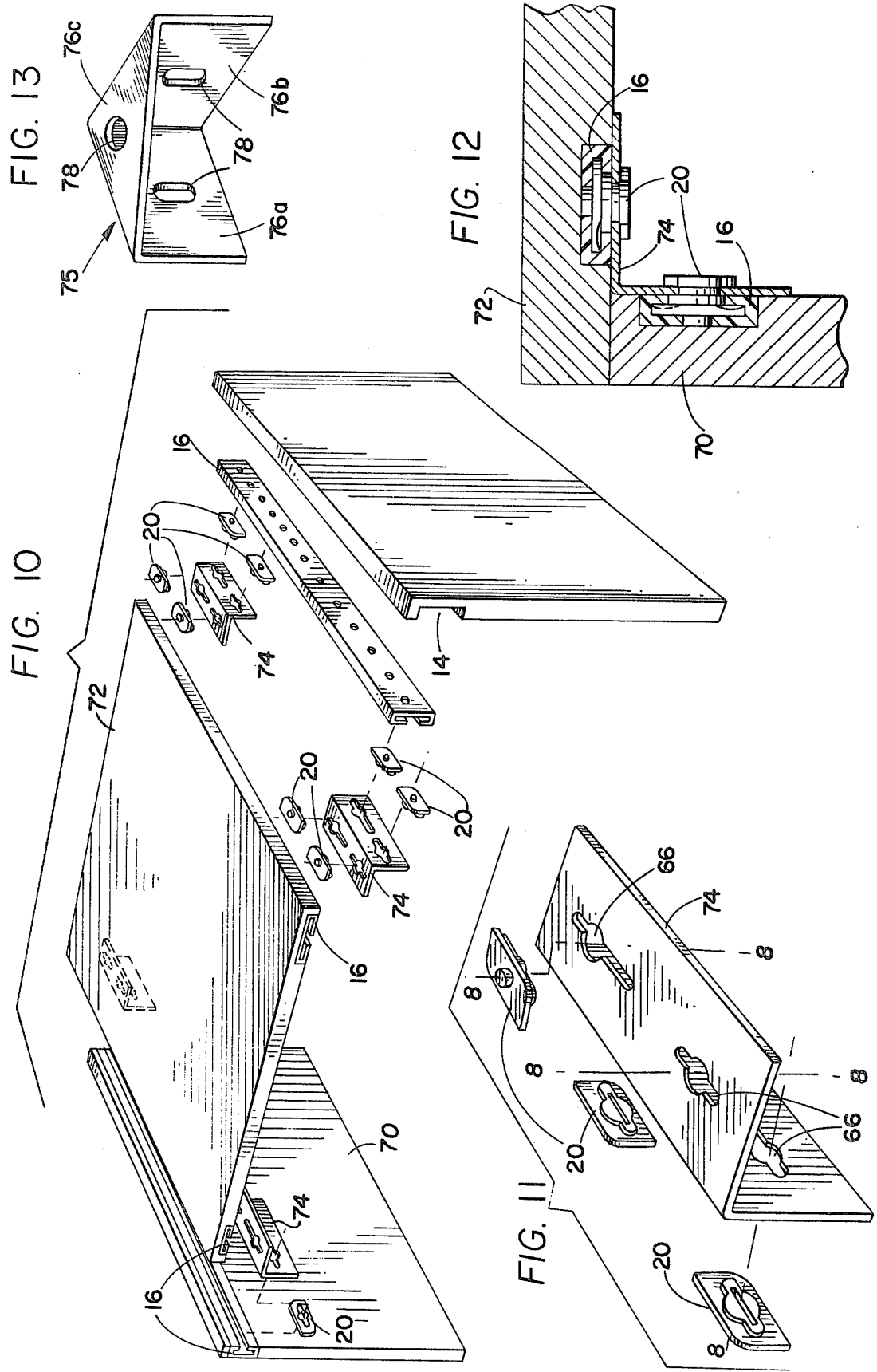

ADJUSTABLE MOUNTING, AND SECURING AND FASTENING ASSEMBLY WITH CHANNEL BAR

CROSS-REFERENCE TO RELATED APPLICATION

This is a continuation-in-part of the following:
INVENTOR: Magnus F. Hagen
Ser. No.: 808,999
FILED: June 22, 1977
TITLE: MOUNTING AND SECURING DEVICE

BACKGROUND OF THE INVENTION

1. Field of the Invention

This invention relates to a mounting and securing assembly wherein an object having a key-hole shaped opening or openings can be adjustably and removably secured to a wall or partition.

2. Description of the Prior Art

As is well known in the art, various problems and difficulties are encountered in providing suitable means for mounting and securing objects to other objects or devices. This is particularly true in the adjustable mountings for the support of drawers, shelves, and other types of suspensions and similar means carrying drawers, chassis, etc., such as telescopic ball-bearing slides.

Several types of adjustable mounting devices are used—and in particular being the very well-known adjustable shelf supports, which generally comprise two or more pilaster steel or metal strips having a plurality of various designed openings whereby elongated support arms having hooked ends are mounted within the openings and are hopefully gripping the openings; or they comprise plastic channels with adjustable standoffs, the standoff being fastened to the strip upon which one places the objects (shelves) but they are not secured to the standoff.

These types of mounting devices cannot provide positive securing of the object to other objects or devices (i.e., shelves, drawer supports, telescoping slides) to compare with the safety and structural soundness of securing these objects by non-adjustable screws or nails or similar positive fastening devices. For screw or similar mountings one also requires tools, considerable installation time, and the object becomes attached to the wall in a relatively permanent state which can only be disengaged by a lengthy and awkward procedure; thus they cannot be termed "adjustable".

In the case of present state-of-the-art "adjustable shelf supports", the average mounting and support units are designed to receive either support clips or standoffs upon which one may place shelves loosely, or such support clips are part of a shelf or drawer slide or other means where these can only be hung into the pilaster openings, and again these are not securely fastened.

Hence, there is a need for positive, adjustable and easily installed means of mounting and securing any number of ojbects, regardless of their shape or use.

SUMMARY OF THE INVENTION

According to the present invention, there is provided a mounting and securing assembly wherein an object having a keyhole shaped opening or openings can be adjustably and removably mounted on and secured to a wall or partition, said assembly comprising:

(1) a channel-like member disposed in or attached to said wall or partition and having a rear wall formed with a plurality of aligned juxtapositioned apertures extending longitudinally thereof; a pair of opposite side walls; a front wall having a longitudinal slot formed therein, and positioned opposite said apertures; and a pair of flange members formed as part of said front wall and defined by said longitudinal slot;

(2) a fastener member formed to be removably mounted in said channel-like member and including a central main body having a maximum diameter equal to, or less than, the width of said longitudinal slot; a front locking bar member; a rear locking bar member wherein said main body is disposed therebetween; and a rearwardly extending stud member positioned on the rear locking bar to be received in one of said apertures in said channel-like member.

Thus, the present invention provides the combination of at least one support channel that is either formed in a substantially stationary member, such as a wall, partition, platform, or formed by an elongated channel-like bar having a main rear wall and front wall having a longitudinal slot formed therein, and defining oppositely disposed flange members, the rear wall being provided with a plurality of holes vertically aligned with the slot of the front wall.

The holes and slot are arranged to removably receive a fastening and support device which comprises a main control support body having a front mounting bar and a rearwardly spaced locking bar, the main support body being disposed therebetween with a rearwardly projecting stud member.

The stud part of the device is adapted to be received in one of the holes; and the locking bar of the device is formed to pass through the slot into the channel-like member formed between the front and rear walls thereof. At this time, both the locking bar and mounting bar of the device are in longitudinal alignment with the elongated slot of the object or member to be mounted, and are positioned to allow the member or object to be slipped over it and thus mounted over the front mounting bar of the device—and thus supported on its main body. This then positions a portion of the mounted object between the front wall or flanges of the channel-like member and the front mounting bar member.

Accordingly, the mounted object or member is locked into a fixed relationship by rotating the fastener and support device. This can be accomplished by hand; however, the front mounting bar also can be provided with a slotted recess to receive a screwdriver, or even a coin, whereby both the locking bar and mounting bar are rotated within the channel. The locking bar of the device includes cam-shaped ends to allow frictional engagement between the respective side walls of the channel-like member as the fastener is rotated approximately 90° therein.

It is important to note that the space provided between the locking bar and the mounting bar must be equal to the combined thickness of the front wall flanges and that portion of the supported object, so that a firm engagement is established between the front wall flanges, the support and fastening device, and the mounting object when the device is locked in place.

Because of the arrangement of each part and member thereof, the shear load is provided mainly between the stud member and the hole area of the channel.

Thus, the material from which the channels and devices are made can vary, depending on the situation and use thereof—that is, various plastics, nylons or metals, or combinations thereof can be employed.

Hence, the structural strength of the adjustable fastening method is very substantial, and comparable to any type of screw mounting.

It should be further understood that the support and fastener member is not just a free-standing standoff, such as used to carry placed-upon shelves and like articles; but this device is employed as a means to secure and fasten an object directly to the fixed channel-like member, at the same time to fully support the object as positively as a screw fastening, and at the same time to provide instant adjustability to different placement areas along the various hole locations of the channel-like member, even without the use of tools.

OBJECTS AND ADVANTAGES OF THE INVENTION

The invention advantageously provides an assembly that is simple to install, without any specific tools, and is easy to adjust or to remove when required.

A further advantage of the invention is that it provides an assembly that is relatively inexpensive to manufacture and use.

A still further advantage of the invention is that it provides an assembly that is simple and rugged in construction, and capable of being universally applied for mounting objects that, prior to this device, were required to be mounted and secured by screws, nuts and bolts, or specially designed fasteners.

Other advantages of use include supporting slides to move drawers in desks, files or like cabinets, and drawers in case goods, kitchen cabinets, and similar structures or fixtures which generally require costly and cumbersome labor efforts, as well as costly provisions within the structure and the functional slide objects.

The characteristics and advantages of the invention are further sufficiently referred to in connection with the accompanying drawings, which represent one embodiment. After considering this example, skilled persons will understand that variations may be made without departing from the principles disclosed, and I contemplate the employment of any structures, arrangements or modes of operation that are properly within the scope of the appended claims.

BRIEF DESCRIPTION OF THE DRAWINGS

The invention is illustrated by way of example in the accompanying drawings, in which

FIG. 7 is a side elevation of a modified form of the fastener member;

FIG. 8 is a top plan view corresponding to FIG. 7;

FIG. 9 is a front elevation corresponding to FIGS. 7 and 8;

FIG. 10 is an exploded view of another arrangement for use in constructing a case, cabinet or the like;

FIG. 11 is an enlarged perspective view of the corner bracket and fasteners of FIG. 10;

FIG. 12 is an enlarged sectional view of one bracket of the arrangement of FIG. 10 when in the assembled position;

FIG. 13 is a perspective view of a corner bracket;

FIG. 14 is a front-elevational view of an alternative arrangement of a fastener member;

FIG. 15 is a top plan view thereof; and

FIG. 16 is a cross-sectional view taken along line 16—16 of FIG. 15.

DESCRIPTION OF THE PREFERRED EMBODIMENT

Figure 1:
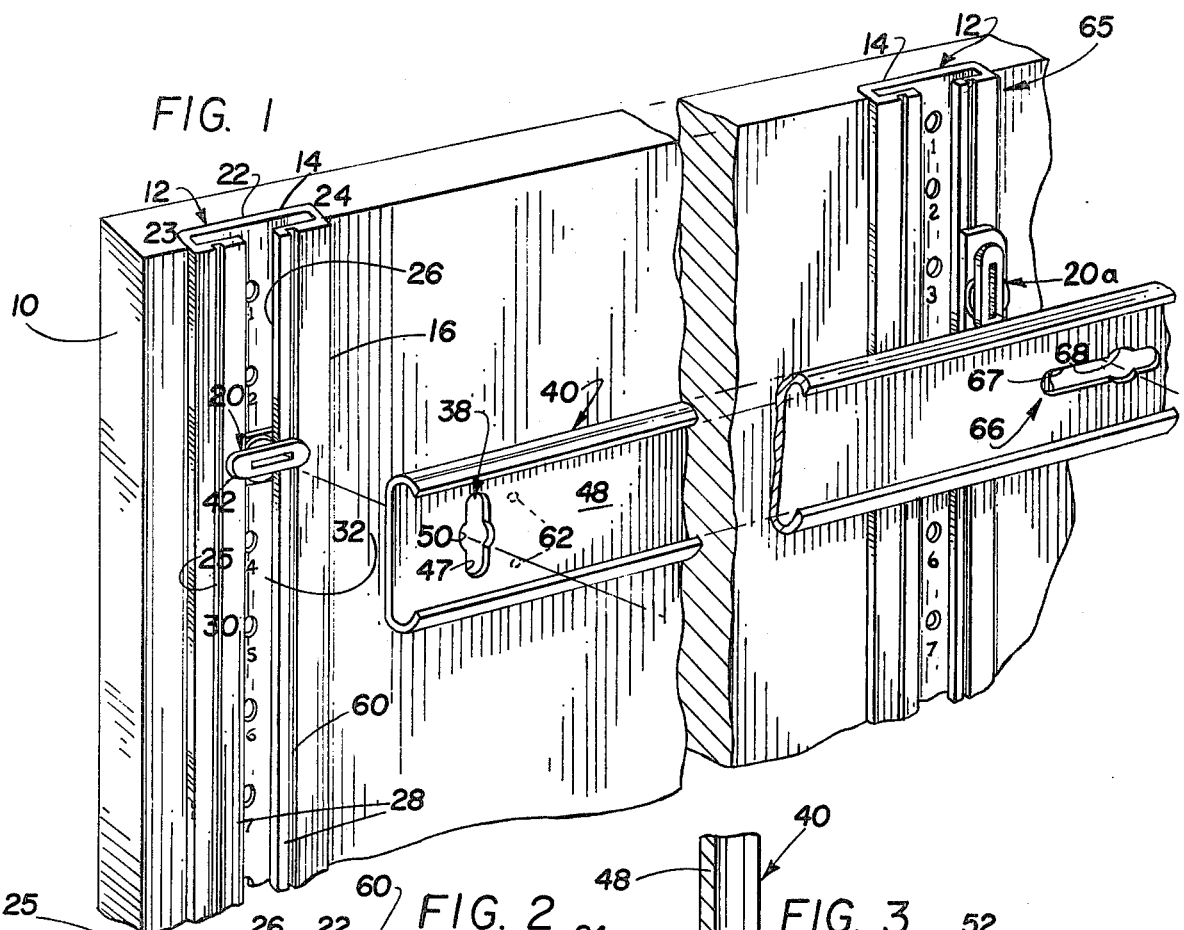
FIG. 1 is a perspective view showing the invention being arranged to receive and supportingly secure a ball-bearing slide member to a wall or partition.

Referring more particularly to FIG. 1, there is shown a substantially fixed wall or partition 10, which represents any structure to which the present invention may be applied. Thus, it should be noted that the wall or partition 10 may be a side wall of a cabinet, file cabinet, desk or any other means that is required to support or mount another object, whether that object be another fixed member or a member such as a drawer slide. Such wall or partition may be of metal, wood, glass, plastic, or any other type construction.

Accordingly, wall or partition 10 is formed with channel means, generally indicated at 12, wherein the channel means can be formed directly within the wall or partition or, as shown in FIG. 1, formed by an elongated vertical groove 14 housing a separate channel-like member 16 fixed therein. However, a channel-like member 16 may be mounted directly to the wall or partition 10 without the use of groove 14.

It should be noted that any number of channel-like members may be provided, the number depending on the object or objects to be removably mounted on and secured to said wall or partition 10.

The channel-like member 16 is so designed as to removably receive a fastener member, indicated generally at 20, which is adapted to be fixedly attached at any selected position to said channel-like member.

Hence, the channel-like member 16 comprises an elongated member having a substantially "C"-shaped cross-sectional configuration. That is, it includes a rear wall 22, forwardly extending side walls 23 and 24, and a front wall 25. Front wall 25 includes an elongated longitudinal slot 26 defining oppositely disposed inturned flanges 28. Slot 26 is arranged to allow direct access to any one of a plurality of apertures or holes 30, these holes 30 being juxtapositioned to each other in a longitudinal manner so as to be directly in line with the longitudinal access slot 26.

Therefore, it can be seen that walls 22, 23 and 24 and flanges 28 define a channelled track 32 which can be formed within the partition or wall 10, or can be mounted on the face of the partition or wall 10.

Fastener and support member 20 comprises a cylindrical main body having a first body part 34, the diameter of which is equal to, or slightly less than, the width of slot 26 so as to be readily received therein. The main body also has a second body part 36 of reduced diameter which is adapted to be received in a keyhole-shaped opening 38 provided in an object to be supported, for example a drawer slide indicated generally at 40.

Figure 4:
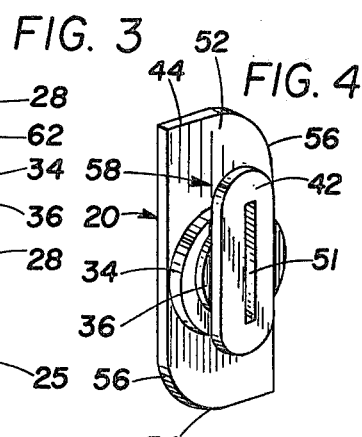
FIG. 4 is a perspective view of the fastener member.
Figure 5:
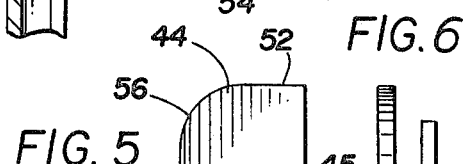
FIG. 5 is a rear-elevational view of the fastener member of FIG. 4.
Figure 6:
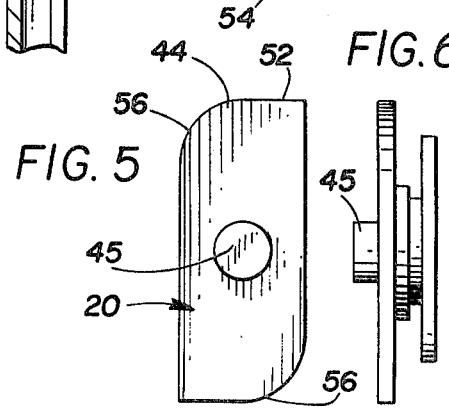
FIG. 6 is a side elevation corresponding to FIG. 5.

Furthermore, the fastener and support member 20 includes a front locking bar 42 defining a mounting bar of elongated formation and a rear locking bar 44, the first and second body parts 34 and 36 being disposed therebetween, as seen in FIGS. 4 and 6. Projecting rearwardly from the rear locking bar 44 is a stud 45 having a diameter which is such that it can be readily received in a selected one of said holes or apertures 30, and having a preferred thickness or length equal to the thickness of the rear wall 22 of the member 16. Thus, the arrangement and size of the stud 45 and hole 30 establish the required shear that is necessary to carry a particular load or object.

As previously mentioned, the object 40 to be supported can be mounted on a single channel-like member 14 and fastener member 20 or, as in the case of the drawer slide illustrated in FIG. 1, the object 40 can be mounted on two spaced channel-like members and associated fastener members.

In order to mount an object on a single channel-like member, the object 40 includes keyhole-shaped opening 38 comprising a slot 47 formed in a wall 48 thereof, said slot 47 including a central enlarged bore 50 having the same diameter as that of body part 36, wherein the slot 47 is wide and long enough to permit passage therethrough of front locking bar 42.

Accordingly, in order to mount the object 40 on, and secure it to, wall or partition 10, the fastener member 20 is inserted into channel track 32, whereby stud 45 is received in a selected hole 30 and the rear locking bar 44 is arranged longitudinally to pass through slot 26, and to be positioned in channel track 32. At this time, the object 40 is disposed over the front locking bar 42, which passes through the slot 47 thereof. Then the fastener member 20 is turned clockwise by hand, or by inserting a coin or tool, such as a screwdriver, into a recess 51 formed in the front locking bar 42.

Figure 2:
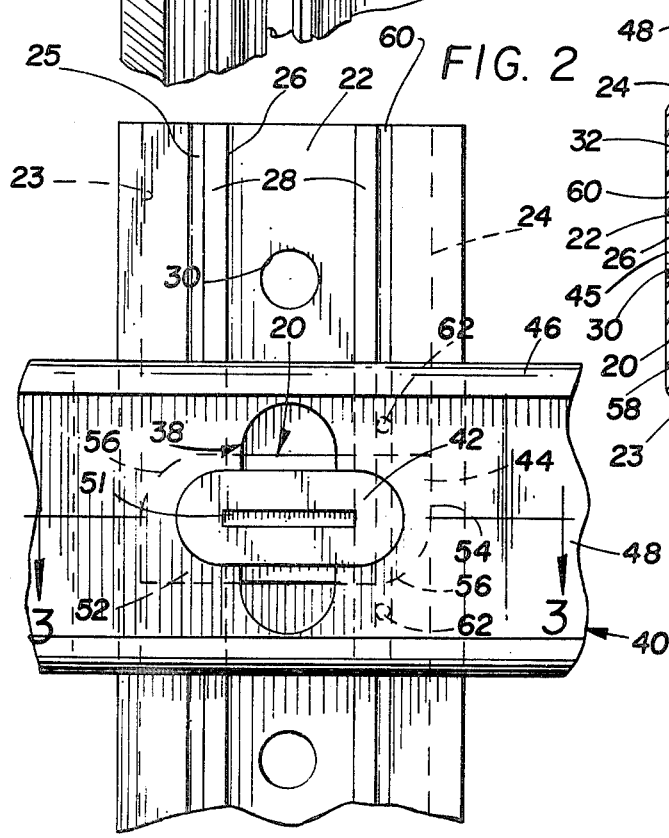
FIG. 2 is an enlarged elevational view of a fastener member secured to a channel-like member wherein an object is mounted and secured thereto.

Thus, as the fastener member 20 is turned, the outer ends 52 and 54 of its rear locking bar 44 engage the side walls 23 and 24, respectively, as seen in FIGS. 1 and 2; wherein rear locking bar 44 defines a locking means which includes cam-locking edges 56 formed on the outer free ends 52 and 54 of the locking bar 44 which limit the rotation of the fastener member 20° to 90°; wherein the upper surface areas of edges 56 of the free ends 52 and 54 engage with the inner surfaces of the front wall flanges 28.

Figure 3:
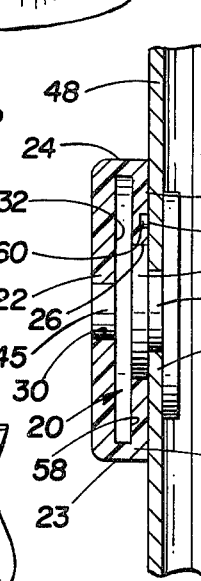
FIG. 3 is a cross-sectional view taken along the line 3—3 of FIG. 2.

It is important to note that the space 58 established between the front locking bar 42 and the rear locking bar 44 must equal the total thickness of front wall flanges 28 and the thickness of wall 48 of the object 40. (This is clearly seen in FIG. 3). This provides a positive, secure mounting between the channel-like member 16 and the mounted object 40.

In order to provide rotational stability to an object mounted on a single channel-like member 16, there is further provided restraining means which comprises a longitudinal groove 60 formed in at least one flange 28 of channel-like member 16, wherein a pair or pairs of nipple members 62 formed on the back side of object 40 are provided to engage said groove or grooves 60. Thus, movement of object 40 is restrained thereby. However, it will be appreciated that other methods of restraint are possible.

However, if an object to be mounted must be supported at at least two points, such as the drawer slide member 40 shown in FIGS. 1 and 2, then a second channel-like member 65 is mounted on the wall or partition as shown in FIG. 1, wherein the slide member includes an additional keyhole-shaped opening 66 having a horizontally disposed slot 67 and enlarged bore 68. In this case, the modified fastener member 20a as shown in FIGS. 7 to 9 is used.

The fastener member 20a, as can be seen in the drawings, is substantially the same as the fastener member 20 except that the second body part 36a is formed with diametrically oppositely disposed flats 36b, and also that the front locking bar 42a is of keyhole-shaped formation instead of being of elongated formation.

Referring to FIG. 1, in order to mount the member 40, a fastener member 20 is positioned in the channel member 16 but not turned through 90°, and a fastener member 20a is positioned in the channel member 65 and turned through 90° into its locked position. The keyhole opening 66 is then placed over the front locking bar 42a and, due to the flats 36b, can be slid lengthwise so that the keyhole opening 38 can be aligned with, and placed over, the front locking bar 42 of member 20. The member 20 is then turned through 90° whereby the member 40 is held in position. Thus, it will be appreciated that, in this arrangement, the channel members 16 and 65 need not be accurately spaced apart.

However, where accurate spacing of the members 16 and 65 can be achieved, it will be obvious that the keyhole opening 66 could be replaced by a verticaly extending keyhole opening 38 in order to achieve the same result. In this case also, the modified fastener member 20a could be used on both members 16 and 65 since, in having vertically extending keyhole openings, no lengthwise movement of the member 40 will take place.

Referring now to FIGS. 10, 11 and 12, the assembly hereinbefore described is used in the construction of a cabinet or other box-shaped housing having two or more walls or partitions 70 and 72. In this case, the object or objects 40 to be mounted are in the form of "L"-shaped brackets 74 having, in each flange thereof, a pair of longitudinally extending keyhole-shaped openings 66. The brackets 74 may be of plastic, metal or other suitable material.

Thus, in order to construct a cabinet, channel-like members 16 are positioned along adjacent edge portions of the walls 70 and 72; and fastener members 20 and 20a are used to mount, and secure in position, the brackets 74 in the manner hereinbefore described. By repeating this procedure, a cabinet can quickly and easily be assembled. The finished cabinet will have total structural stability which is equal to the use of present known methods of gluing and/or screwing such structures together.

It is also possible to use corner brackets, generally indicated at 75, to join together three adjacent walls or partitions. In this case, the bracket will have three right-angled flanges 76a, 76b and 76c, each having a single keyhole-shaped opening 78 as seen in FIG. 13.

However, corner bracket 75 is shown having keyholes 78, wherein the configuration thereof is a single elongated hole adapted to receive fastener members 20b, as illustrated in FIGS. 14 through 16. Fastener member 20b is similar to the above-described members 20 and 20a except that the cylindrical main body 34b is eccentrically positioned between front locking bar 42b and rear locking bar 44b, front locking bar 42b being shown as a concentric circular head member.

In this arrangement, fastener members 20b are operably mounted in keyholes 78 of bracket 75, wherein eccentric body 34b acts as a cam to engage the keyholes, causing the bracket to be moved to one side. This side movement causes the adjacent edge portions of walls 70 and 72 to be firmly secured in position against each other.

In order to facilitate cutting to length of the channel like members, these may be formed, at spaced regular intervals, with transversely disposed lines or grooves.

Furthermore, in order to facilitate accurate positioning of an object to be supported, the apertures 30 of the channel-like members may be numbered consecutively.

It will be understood from the foregoing that it is possible to similarly construct and securely fasten structural objects such as walls to each other by the methods hereinbefore described and that various changes may be made in the form, construction and arrangement of the parts of the invention without departing from the scope thereof as defined in the following claims, thus providing simple fast disassembly (knock-down) and reassembly methods by unskilled personnel and without the use of tools.

I claim:

1. A mounting and securing assembly wherein an object having a keyhole-shaped opening or openings can be adjustably and removably mounted on and secured to a wall or partition, said assembly comprising:
 a channel-like member disposed in or attached to said wall or partition and having a rear wall formed with a plurality of aligned juxtapositioned apertures extending longitudinally thereof; a pair of opposite side walls; a front wall having a longitudinal slot formed therein, and positioned opposite said apertures, and a pair of flange members formed as part of said front wall and defined by said longitudinal slot, said channel like member having a substantially "C"-shaped cross-sectional configuration;
 a fastener member formed to be removably mounted in said channel-like member and including a central main body having a maximum diameter equal to, or less than, the width of said longitudinal slot; a front locking bar member; a rear locking bar member wherein said main body is disposed therebetween, said rear locking bar member being received and locked in said channel member when said fastener member is rotated through 90°; and a rearwardly extending stud member positioned on the rear locking bar to be received in one of said apertures in said channel-like member; and wherein said front locking bar is formed to extend through a wall of said object having said keyhole-shaped opening formed therein, said object being supported on said central main body and held in engagement with said front wall of said channel like member, wherein a space is defined between said front locking bar and said rear locking bar, the combined thickness of said flanges and said wall of said object to be mounted being equal to the width of said space, and wherein said rear locking bar includes a locking means.

2. An assembly as claimed in claim 1, wherein said locking means comprises said rear locking bar having oppositely disposed free ends formed with cam edges, said cam edge of each free end engaging said side walls of said channel member when said fastener member is rotated through 90° into a locked position.

3. An assembly as claimed in claim 2, wherein said channel like member includes restraining means whereby said object to be mounted is held in a stable position relative to said wall or partition.

4. An assembly as claimed in claim 3, wherein said restraining means comprises a longitudinal recess formed in at least one of said flange members to receive a pair of nipples or projections formed on said wall of said object to be mounted thereon.

5. An assembly as claimed in claim 4, wherein said central main body includes a first body part adjacent said rear locking bar, and a second body part adjacent said front locking bar and of lesser diameter than that of the first body part, the first body part being accommodated in the longitudinal slot of the channel member and the second body part being accommodated in the keyhole-shaped opening of said object to be mounted.

6. An assembly as claimed in claim 5, wherein the front locking bar is of elongated formation.

7. An assembly as claimed in claim 5, wherein the front locking bar is of keyhole-shaped formation and said second body part is formed with diametrically opposite flats.

8. An assembly as claimed in any one of claims 6 or 7, wherein said front locking bar is formed with a recess or slot to receive a tool to facilitate angular turning thereof.

9. An assembly as claimed in claim 8, wherein the channel like member is marked or formed, at spaced regular intervals, with transversely disposed lines or grooves to facilitate cutting to length of the channel member.

10. An assembly as claimed in claim 9, wherein said apertures in saic channel-like member are numbered consecutively to facilitate cutting to length and positioning of said object to be supported.

11. A mounting and securing device wherein an object can be adjustably and removably mounted and secured to a substantially fixed wall or partition, said device comprising a channel means disposed in said wall or partition wherein said channel means includes:
 a rear wall having a plurality of juxtapositioned apertures aligned longitudinally therein;
 a pair of opposite side walls;
 a front wall having a longitudinal slot formed therein, and positioned opposite said apertures;
 a pair of flange members formed as part of said front wall defined by said longitudinal slot;
 a restraining means positioned in said channel means, whereby said object to be mounted is held in a stable position relative to said wall or partition, wherein said restraining means comprises a longitudinal recess formed in at least one flange member; and a pair of nipple members projecting from said wall of said object to be mounted thereon wherein the nipples are arranged to be received in said recess;
 a fastener means formed to be removably mounted in said channel means, said fastener means comprising a central main body member having a diameter equal to or less than the width of said longitudinal slot; a front locking bar member defining a mounting bar; and a rear locking bar member defining a locking bar wherein said main body is disposed therebetween; and
 a rearwardly projecting load-supporting stud member positioned to be received in one of said apertures in said channel means to establish the required shear to carry a particular load.

* * * * *